United States Patent [19]

Zijlstra

[11] 3,728,646

[45] Apr. 17, 1973

[54] ACOUSTIC DELAY LINE

[75] Inventor: Anthonie Louis Zijlstra, Emmasingel, Eindhoven, Netherlands

[73] Assignee: U.S. Philips Corporation, New York, N.Y.

[22] Filed: Feb. 25, 1971

[21] Appl. No.: 119,004

Related U.S. Application Data

[63] Continuation of Ser. No. 738,394, June 20, 1968, abandoned.

[52] U.S. Cl.......................333/30 R, 106/52, 106/53, 106/54

[51] Int. Cl...........C03c 3/30, C03c 3/04, H03h 7/30

[58] Field of Search.....................106/52, 53; 333/30

[56] References Cited

UNITED STATES PATENTS

| | | | |
|---|---|---|---|
| 3,154,425 | 10/1964 | Hoover et al. | 106/53 |
| 3,296,561 | 1/1967 | Polucci | 333/30 |
| 3,550,044 | 12/1970 | Hayakawa et al. | 333/30 |

FOREIGN PATENTS OR APPLICATIONS

| | | | |
|---|---|---|---|
| 2,005,676 | 12/1969 | France | 106/53 |

*Primary Examiner*—Winston A. Douglas
*Assistant Examiner*—Mark Bell
*Attorney*—Frank R. Trifari

[57] ABSTRACT

A glass for an acoustic delay line which consists of $SiO_2$, $Al_2O_3$, $B_2O_3$ and an oxide of a bivalent metal and satisfies the requirement that $-5\times10^{-6} < \Sigma_i\ \alpha_i\ x_1 < +5\times10^{6}$ where $\alpha_i$ is the temperature coefficient of the rate of propagation in the range of 20°–70° C for the oxide component $i$ and $x_i$ is the molar fraction of that component.

2 Claims, No Drawings

ACOUSTIC DELAY LINE

This application is a continuation of U.S. application Ser. No. 738,394, filed June 20, 1968, now abandoned.

The invention relates to an acoustic delay line in which the delay medium is glass.

Such delay lines are known per se for electronic uses in which delays of electric signals in the order 0.01–1 millisecond are to be obtained with bandwidths of a few tens of mc/s. The delay is produced in that an electric signal is converted, by means of a piezo-electric element, into an ultrasonic mechanical vibration, preferably a shear vibration, and after said acoustic signal has traversed the delay medium this is likewise converted again into an electric signal by a piezo-electric element, said signal having experienced the desired delay with respect to the original signal. The rate of propagation of the acoustic shear waves in a solid is approximately $10^5$ times smaller than that of electro-magnetic waves so that a comparatively large delay can be obtained over a comparatively small distance.

Delay lines are used inter alia in electronic computers, in radar technology and in television technology. In two color television systems delay lines are used for combining the color information of adjacent lines of a frame. The delay time required for this purpose is approximately 64 $\mu$sec. with 625 lines and a frequency of 50 c/s. At the frequency to be considered of 4.43 mc/s and the required bandwidth of approximately 2 mc/s, glass is a suitable delay medium.

A known glass which is excellency suitable for this purpose has the following composition in mol. percent:

| | |
|---|---|
| $SiO_2$ | 70–78 |
| PbO | 15–30, of which maximally 5 mol. percent may be replaced by one or more of the oxides MgO, BaO, CaO and SrO, |
| $Na_2O + K_2O$ | 0-7 |
| $Na_2O$ | $\leq$0.5 |
| $SB_2O_3 + As_2O_3$ | $\leq$0.5 |

This glass is distinguished by the quality of various properties which are of importance for the end in view. Taking into account the temperature variations of ±30° C occurring in practice, the delay times does not vary more than 0.02 $\mu$sec. This means that the temperature coefficient of the delay time $d\tau/(\tau d\tau)$ of these glasses is smaller than $10 \times 10^{-6}$ per ° C and in some cases even smaller than $1 \times 10^{-6}$ per ° C.

The damping of the acoustic vibrations in delay lines of this class is not too large. The mechanical attenuation of said glass is not more than $9 \times 10^{-3}$ dB/$\mu$s. Mc/s which is amply sufficient for delay lines in television receivers.

A further advantage of this glass consists in that it is very slightly sensitive to the previous thermal history of the glass which means that it has substantially no influence on the temperature coefficient of the delay time, whether the glass has been cooled relatively rapidly or slowly from temperatures in the proximity of the annealing temperature. Large variations in the treatment which consists of a heating for approximately 10 minutes at a temperature which lies approximately 50° C above the annealing temperature succeeded by cooling at a rate of approximately 1.5° C per minute, do substantially not influence the reproducibility.

Finally, a hysteresis effect is not present in this glass to any inconvenient extent, in contrast with some other known glasses. This hysteresis effect manifests itself in the delay time when the glass is heated from room temperature to a temperature between 60° and 80° C, is kept at said temperature for more than 1 hour, and is then cooled to room temperature again. The delay time at room temperature may be increased 1 to $10^4$, said increase disappearing again gradually in the course of a few days. In the above-mentioned glasses said variation is at most 3 to $10^5$ at the temperature cycle described.

The rate of propagation for shear waves in these glasses is comparatively low and varies only slightly with the composition (2,400–2,600 m/sec.).

A difficulty in manufacturing the glass compositions required for delay lines is associated with the fact that small variations in the composition of a chosen glass may cause variations in the acoustic properties, notably in the temperature coefficient of the delay time. This is most undesirable, particularly when used in delay lines for color television. So this involves the necessity of keeping the content of the components of the glass constant between narrow limits. The known glasses have a high content of lead monoxide. However, lead monoxide has the property of partly evaporating at the surface of the glass melt so that there the PbO-content is considerably reduced. If such a glass, originating from the surface layer of the melt, forms part of the delay body, the good operation as a delay medium may be disturbed.

Possibilities are known, it is true, to restrict said evaporation of PbO. However, these requires special precautionary measures.

The invention provides a class of glasses of which the drawback of evaporation of one or more of the components with the resulting adverse influence on the acoustic properties of the glass is considerably smaller while the above-mentioned advantageous properties of the known glass are maintained therein.

According to the invention the acoustic delay line, the delay body of which consists of glass which contains the components $SiO_2$, $K_2O$ and oxide of bivalent metal, is characterized in that the glass has the following composition in percent by weight:

| | | |
|---|---|---|
| $SiO_2$ | 50–75 | |
| $K_2O + Na_2O$ | 0–8 | |
| $Na_2O$ | $\leq$ 0.5 | |
| $Sb_2O_3 + As_2O_3$ | $\leq$ 1.5 | |
| $B_2O_3$ | < 5 | |
| $Al_2O_3$ | < 15 | |
| PbO | 0–10 | |
| CaO | 0–20 | |
| BaO | 0–40 | |
| MgO | 0–10 | totally 20–50 |
| ZnO | 0–25 | |
| CdO | 0–35 | |
| SrO | 0–30 | |
| $Bi_2O_3$ | 0–30 | |

on the understanding, however, that the requirement is also satisfied, that $-5 \times 10^{-6} < \Sigma_i \alpha_i x_i < +5 \times 10^{-6}$, where $\alpha_i$ is the factor for the temperature coefficient of the rate of propagation in the range of 20° to 70° C for the oxidic component $i$ and $x_i$ is the molar fraction in which said component is present in the glass.

During the experiments which led to the invention it was found that the temperature coefficient of the rate of propagation of acoustic shear waves is an additive quantity with respect to said quantity for the free oxidic components. In order that the temperature coefficient of the delay line be substantially zero, the above condition should be fulfilled. Within the above-mentioned range of compositions, only those glasses may be used as a delay medium in ultrasonic delay lines for the above-mentioned purposes in which the said condition is fulfilled without having to use additive ancillary means which have for their object to improve a delay line the temperature coefficient of which is not equal to zero, for example, by the combination with an electric transit time line the temperature coefficient of which is equal to but opposite to that of the glass delay line.

In the following Table I the values of the factors $\alpha_i$ are listed for the oxides to be considered.

TABLE I

| Oxide i | $\alpha_i + 10^6$ |
|---|---|
| $SiO_2$ | −100 |
| $B_2O_3$ | −90 |
| $Al_2O_3$ | +180 |
| ZnO | +165 |
| PbO | +285 |
| CaO | +340 |
| BaO | +350 |
| MgO | +325 |
| CdO | +210 |
| $Bi_2O_3$ | +350 |
| SrO | +350 |
| $K_2O$ | +300 |

$As_2O_3$ and $Sb_2O_3$ may be neglected in the calculation. The accuracy of the value of the temperature coefficient calculated by means of the formula is such that for glasses which have been cooled at a rate of approximately 1° C per minute from the highest annealing temperature or 50° C above said temperature said value does not differ from the experimentally determined value of the temperature coefficient more than $\pm 5 \times 10^{-6}$ /° C over the temperature range of 20° – 70° C. With a desired greater accuracy a quantity of one or more components, starting from a previously chosen composition, may be varied until the desired value of the temperature coefficient has been reached. As a rule the desired value for glasses which are used as an acoustic medium will be equal to or substantially equal to zero but in some cases a value differing slightly from zero is desirable in order to obtain an optimum action of the delay line in a temperature range other than the said range of 20° to 70° C or to compensate for the temperature coefficient of the transducers and/or other components of the associated electric circuit. Alternatively, a different manner of cooling may result in a slightly differing value of the temperature coefficient.

The glasses according to the invention for the present use and a good stability, that is to say that the above-mentioned hysteresis effects do not occur to any inconvenient extent also after prolonged use.

Whereas for most of the known glasses the delay time $\tau$ in accordance with temperature has an approximately parabolic variation:

$$(\Delta\tau)/\tau = c\cdot(T - T_o)^2$$

in the temperature range in which $|T - T_o| \leq 50°$ C and in which $c$ is approximately $+0.04 \times 10^{-6}/(° C)^2$, the value of $c$ for a large number of glasses according to the invention is only $+0.02 \times 10^{-6}/(° C)^2$, so that the constancy of the delay time as a function of the temperature for these glasses is still larger than for the known types of glass.

The rate of propagation of acoustic shear waves varies for the glasses with compositions within the range according to the invention from 2,800 to 3,500 m/sec. These values are somewhat higher than the above-mentioned known glasses (2,400–2,600 m/sec.) which means that for the same delay time a proportionally larger length of the acoustic beam is necessary. For delay lines having a small delay time of, for example, 64 $\mu$sec., however, that is no objection.

A preferred range of compositions is determined by the following limits (also in percent by weight).

| | | |
|---|---|---|
| $SiO_2$ | 60–70 | |
| $K_2O+Na_2O$ | 2–6 | |
| $Na_2O$ | ≤ 0.5 | |
| $Sb_2O_3$az$As_2O_3$ | ≤ 1.5 | |
| $B_2O_3$ | <5 | |
| $Al_2O_3$ | <15 | |
| PbO | 0–5 | |
| CaO | 0–10 | |
| BaO | 0–25 | |
| MgO | 0–5 | together 25–38 i.e., the remainder not less than 25 |
| ZnO | 0–15 | |
| CdO | 0–20 | |
| SrO | 0–15 | |
| $Bi_2O_3$ | 0–20 | |

A few examples of glass types which are used according to the invention as a delay medium in an acoustic delay line are the following which are stated in mol. percent and in wt. percent. Stated are the following properties: the average temperature coefficient $TC = (\Delta\tau)/(T\Delta T)$ in the temperature range of 20°–70° C in $10^{-6}$ per ° C, the variation (ΔTC) at 20° C of the temperature coefficient in $10^{-6}$ per ° C after a cooling treatment in which the glass is heated from room temperature to 50° C above the annealing temperature of the glass and is then cooled to room temperature at a rate of 1 ½° C per minute compared with that of the glass in which it is cooled at a rate of approximately 100° C per minute and the value of the constant $c$ from the above formula in $10^{-8}$ per (° C) $^2$.

TABLE II

| | 1 Mol % | Wt. % | 2 Mol % | Wt. % | 3 Mol % | Wt. % | 4 Mol % | Wt. % |
|---|---|---|---|---|---|---|---|---|
| $SiO_2$ | 74.0 | 63.7 | 69.2 | 54.3 | 67.0 | 62.0 | 72.9 | 60.7 |
| $B_2O_3$ | | | 3.0 | 2.7 | 3.0 | 3.2 | | |
| $Al_2O_3$ | | | 5.0 | 6.7 | 5.0 | 7.9 | | |
| $K_2O$ | 2.5 | 3.4 | 2.5 | 3.1 | 2.5 | 3.6 | 2.5 | 3.3 |
| PbO | | | | | | | | |
| CaO | 7.9 | 6.4 | | | 5.0 | 4.3 | 5.0 | 3.9 |
| BaO | 7.7 | 16.9 | 12.1 | 24.2 | | | 6.5 | 13.8 |
| ZnO | 7.7 | 9.0 | 8.0 | 8.5 | 12.3 | 15.3 | 8.9 | |
| MgO | | | | | 5.0 | 3.1 | | |
| CdO | | | | | | | 5.0 | 8.9 |
| $As_2O_3$ | 0.2 | 0.6 | 0.2 | 0.5 | 0.2 | 0.6 | 0.2 | 0.5 |
| TC | 0 ± 1 | | 0 ± 1 | | 0 ± 1 | | 0 ± 1 | |
| ΔTC | 4 | | 3 | | 6 | | 6 | |
| c. | 3 | | 3 | | 4 | | 3 | |
| | **5 Mol %** | **Wt. %** | **6 Mol %** | **Wt. %** | **7 Mol %** | **Wt. %** | **8 Mol %** | **Wt. %** |
| $SiO_2$ | 76.8 | 53.9 | 73.3 | 58.5 | 70.1 | 60.7 | 72.6 | 62.5 |
| $B_2O_5$ | | | | | 5.0 | 5.1 | | |
| $Al_2O_3$ | | | | | 5.0 | 7.4 | | |

| | | | | | | | | |
|---|---|---|---|---|---|---|---|---|
| $K_2O$ | 2.5 | 2.8 | 2.5 | 3.1 | 2.5 | 3.4 | 2.5 | 3.4 |
| PbO | | | | | | | | |
| CaO | 5.0 | 3.3 | | | 5.0 | 4.0 | 7.0 | 5.6 |
| BaO | 5.5 | 9.9 | 11.0 | 22.4 | 7.2 | 15.9 | 7.0 | 15.4 |
| ZnO | | | 8.0 | 8.6 | | | 10.7 | 12.5 |
| MgO | 5.0 | 2.3 | | | 5.0 | 2.9 | | |
| SrO | | | 5.0 | 6.9 | | | | |
| $Bi_2O_3$ | 5.0 | 27.3 | | | | | | |
| $As_2O_3$ | 0.2 | 0.5 | 0.2 | 0.5 | 0.2 | 0.6 | 0.2 | 0.6 |
| TC | 0 ± 1 | | 0 ± 1 | | 0 ± 1 | | 0 ± 1 | |
| ΔTC | 6 | | 3 | | 3 | | 5 | |
| c. | 2 | | 3 | | 2 | | 3 | |

What we claim is:

1. In an acoustic delay line of the type having signal converting elements on the surface of a glass body for converting an input electric signal into an acoustic signal and an output acoustic signal into an electrical signal, the improvement comprising that said body of glass consist of the following compositions in wt. percent:

| | | |
|---|---|---|
| $SiO_2$ | 50–75 | |
| $K_2O + Na_2O$ | 0–8 | |
| $Na_2O$ | ≤ 0.5 | |
| $Sb_2O_3 + As_2O_3$ | ≤ 1.5 | |
| $B_2O_3$ | < 5 | |
| $Al_2O_3$ | <15 | |
| PbO | 0–10 | Totally 20-50 |
| CaO | 0–20 | |
| BaO | 0–40 | |
| MgO | 0–10 | |
| ZnO | 0–25 | |
| CdO | 0–35 | |
| SrO | 0–30 | |
| $Bi_2O_3$ | 0–30 | |

said glass satisfying the requirement that $-5 \times 10^{-6} < \Sigma\alpha_i x_i < +5 \times 10^{-6}$, where $\alpha_i$ is the temperature coefficient of the rate of propagation in the range of 20° – 70° C for the oxide component $i$ as listed above for the relative oxides and $x_i$ is the molar fraction of said component in the glass.

2. In an acoustic delay line of the type having signal converting elements on the surface of a glass body for converting an input electric signal into an acoustic signal and an output acoustic signal into an electric signal, the improvement comprising that said body of glass consist of the following composition in wt. percent:

| | |
|---|---|
| $SiO_2$ | 60–70 |
| $K_2O + Na_2O$ | 2–6 |
| $Na_2O$ | ≤ 0.5 |
| $Sb_2O_2 + As_2O_3$ | ≤ 1.5 |
| $B_2O_3$ | < 5 |
| $Al_2O_3$ | <15 |

and the remainder not less than 25 percent by weight of the following constituents:

| | |
|---|---|
| PbO | 0–5 |
| CaO | 0–10 |
| BaO | 0–25 |
| MgO | 0–5 |
| ZnO | 0–15 |
| CdO | 0–20 |
| SrO | 0–15 |
| $Bi_2O_3$ | 0–20 |

said glass also satisfying the requirement that $-5\times10^{-6} < \Sigma_i\alpha_i x_i < +5\times10^{-6}$, where $\alpha_i$ is the temperature coefficient of the rate of propagation in the range of 20°–70 ° C for the oxide component $i$ as listed above for the corresponding oxides and $x_i$ is the molar fraction of said component in the glass.

* * * * *